(12) United States Patent
Hauck et al.

(10) Patent No.: US 6,241,257 B1
(45) Date of Patent: Jun. 5, 2001

(54) FASTENING DEVICE FOR BELT PULLEYS

(75) Inventors: Helmut Hauck, Euerbach; Deiter Plössl, Bergrheimfeld; Robert Stolz, Schweinfurt; Bettina Stoyke, Schonungen/Marktsteinach, all of (DE)

(73) Assignee: SKF GmbH (DE)

(*) Notice: Subject to any disclaimer, the term of this patent is extended or adjusted under 35 U.S.C. 154(b) by 0 days.

(21) Appl. No.: 09/197,631

(22) Filed: Nov. 23, 1998

(30) Foreign Application Priority Data

Nov. 22, 1997 (DE) .......................... 297 20 776 U

(51) Int. Cl.$^7$ ....................................... F16H 7/12
(52) U.S. Cl. .................. 277/637; 384/448; 384/489; 474/199
(58) Field of Search .................... 384/547, 477, 384/448, 489; 474/166, 199; 277/637, 628, 630, 634, 653

(56) References Cited

U.S. PATENT DOCUMENTS

| 5,421,788 | * | 6/1995 | Toth | 474/166 |
| 5,964,674 | * | 10/1999 | Serkh | 474/166 |
| 5,993,343 | * | 11/1999 | Rocca et al. | 474/135 |
| 6,059,679 | * | 5/2000 | Tsutsui et al. | 474/166 |

FOREIGN PATENT DOCUMENTS

4242293A1  12/1992  (DE) .

* cited by examiner

*Primary Examiner*—Anthony Knight
*Assistant Examiner*—Enoch E Peavey
(74) *Attorney, Agent, or Firm*—Eugene E. Renz, Jr., PC

(57) ABSTRACT

The combination comprising, a bearing housed in a belt pulley, a sealing disk covering the bearing clamped between the head of a screw and the inner ring of the roller bearing, means attaching said sealing disk 4 directly to the inner ring axially and radially and including projections 13, 14 extending into the bore of the inner ring to secure the screw 3 for transport.

2 Claims, 2 Drawing Sheets

FASTENING DEVICE FOR BELT PULLEYS

BACKGROUND OF THE INVENTION

It is already known from DE 4,242,293 that a belt pulley can be attached by means of a screw to the pivoting arm of a tensioning device. A sealing disk is clamped between the head of the screw and the lateral surface of the inner ring of the roller bearing to protect the roller bearing against the intrusion of dirt and other solid particles and to serve as a washer for the screw. When the belt pulley is fabricated and transported as a spare part for the known tensioning device or as an independent product for idling purposes, there is the danger that the accompanying screw and the sealing disk can fall out and be lost.

SUMMARY OF THE INVENTION

It is therefore an object of the present invention to create a fastening device for a belt pulley which can be transported and handled safely as a compact unit and without the loss of any of the individual parts.

The task is accomplished in that the sealing disk is attached directly to the inner ring both axially and radially. The sealing disk has projections extending into the bore of the inner ring to secure the screw in the axial direction for transport.

By attaching the sealing disk independently to the inner ring and the screw independently to the sealing disk, the invention creates a transport assembly which does not require any additional parts and does not lead to any significant extra expense. Sealing disk, screw, and pulley form a compact unit. The screw can turn freely but is secured in the axial direction.

BRIEF DESCRIPTION OF THE DRAWINGS

These and other objects of the present invention and various features and details of the operation and construction thereof are hereinafter more fully set forth with reference to the accompanying drawings, wherein.

DESCRIPTION OF THE METHOD AND SYSTEM

Figure 1:
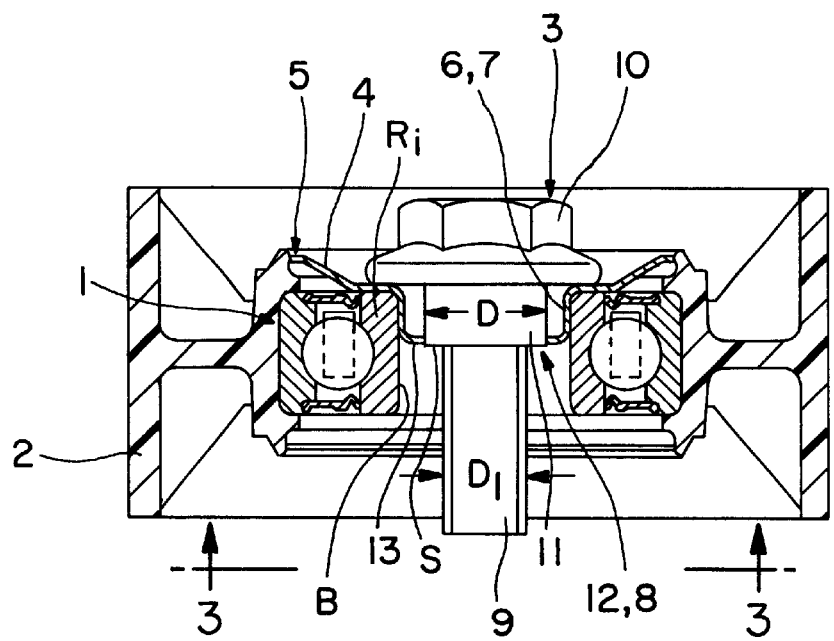
FIG. 1 shows a longitudinal section through a belt pulley with a press-fit sealing disk, the screw being secured axially by peened areas.

Referring now to the drawings and particularly to FIG. 1, thereof, the belt pulley shown consists essentially of a sealed ball bearing 1, a molded-on pulley shell or housing 2, preferably made of plastic, and a fastening device $D_f$. This device consists of a screw 3 and a sealing disk 4, which protects ball bearing 1 against sprayed water and hard particles. The disk 4 can be fabricated from a flat disk of sheet metal. The outer periphery of the disk 4 cooperates with the hub $2_a$ of pulley shell 2 to form a labyrinth seal 5.

In the center of the disk 4, a cup-shaped, generally cylindrical stamped-in area 6 is provided having lateral surface 7 which is pressed into the bore B of the inner ring $R_i$. A central hole 8 in the disk 4 accepts shaft 9 of screw 3. The head of the screw 3 rests on the lateral surface 7 of the inner ring $R_i$ by way of sealing disk 4. A shaft 9 projects axially from the head 10 comprising a shaft section 11 adjacent to head 10 of a larger diameter D than the diameter $D_1$ of the shaft 9 which serves to center screw 3 with respect to the inner ring $R_i$ but still allows the screw to rotate.

Figure 3:
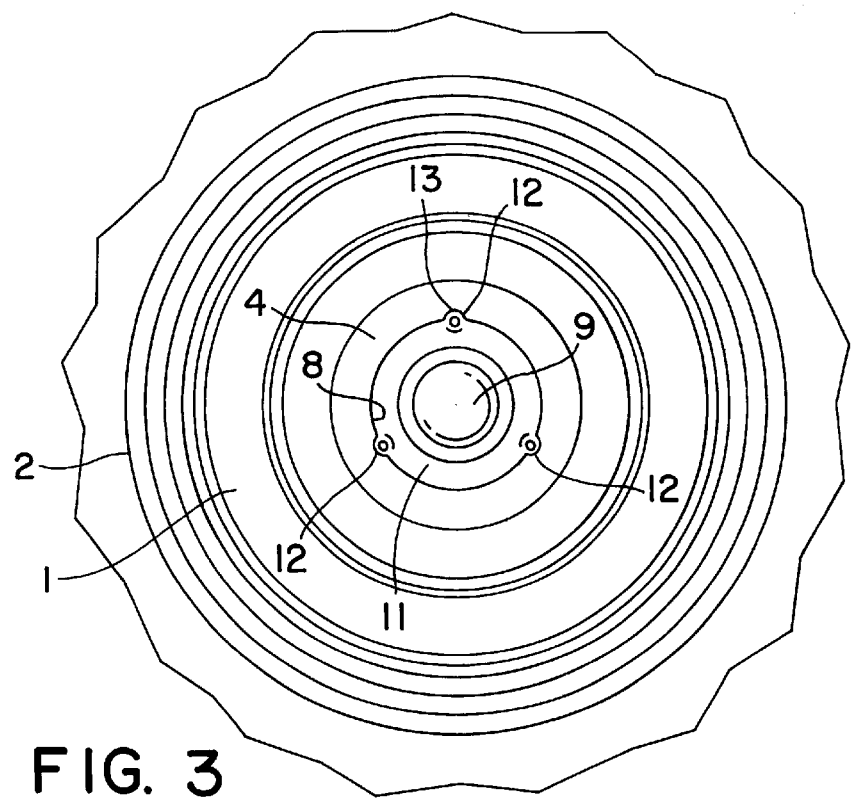
FIG. 3 is a slightly enlarged fragmentary bottom plan view taken on the line 3,3 of FIG. 1 showing a series of equally spaced circumferentially positioned peened areas securing the screw to the sealing disk.
Figure 4:
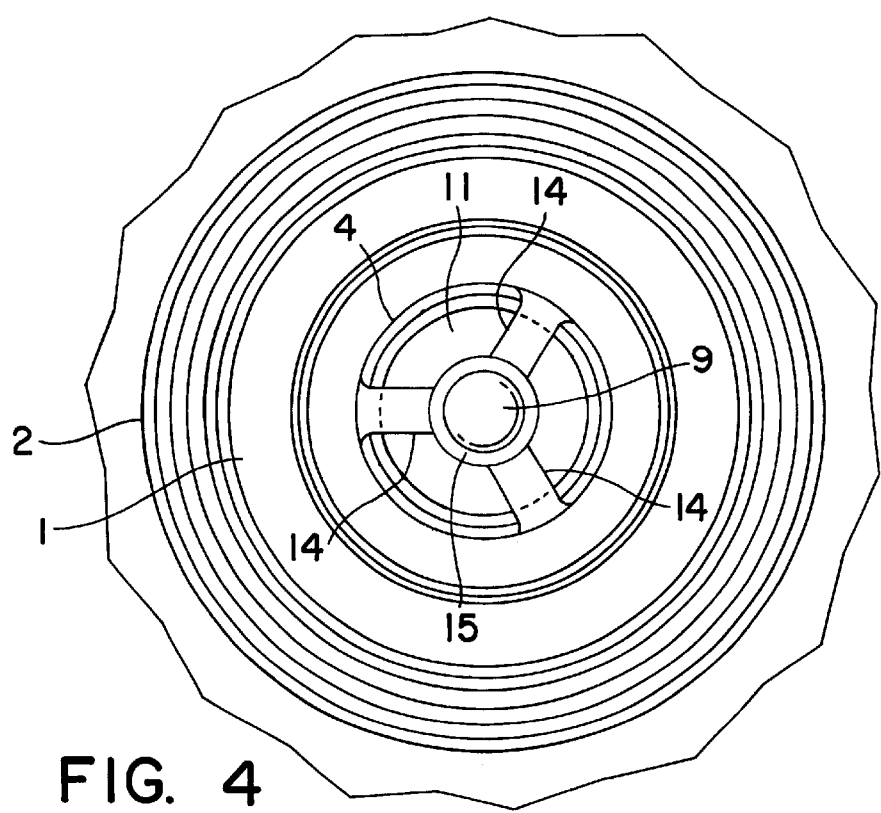
FIG. 4 is a slightly enlarged fragmentary bottom plan view taken on the line 4,4 of FIG. 2 showing a series of equally spaced circumferentially positioned elastic tongues used to secure the bolt to the sealing disk.

In the design according to FIG. 1, thicker shaft section 11 of screw 3 continues in the axial direction as a shaft 9 of smaller diameter $D_i$, which passes through central hole 8 in stamped cup 6. The radial surface S at the juncture of shaft sections 9 and 11 is peened over at a number of points around the periphery, thus forming radial projections 12 (see FIG. 3). The projections 12 cooperate with the edge of hole 8, designed as a locking section 13, to form a positive interlock, which prevent screw 3 from falling out in the axial direction.

Figure 2:
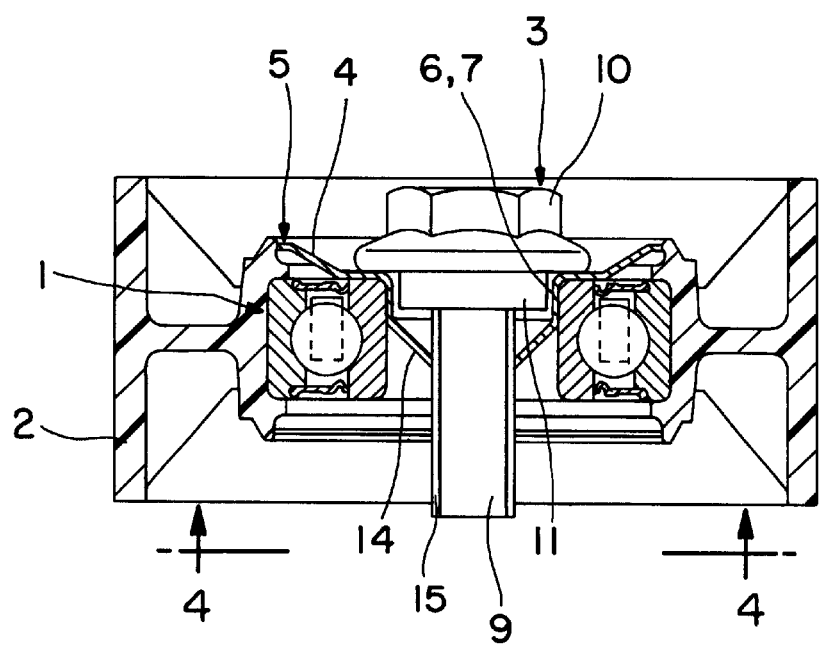
FIG. 2 shows a longitudinal section through a belt pulley with a sealing disk with elastic tongues.

In the design according to FIG. 2, elastic tongues 14, which are distributed around the periphery, are formed on lateral surface 7 of cup 6 and press at a slant in the axial/radial direction against thread 15 of shaft 9. As a result, a positive interlock which prevents screw 3 from falling out in the axial direction is again created.

Even though particular embodiments of the present invention have been illustrated and described herein, it is not intended to limit the invention and changes and modifications may be made therein within the scope of the following claims.

What is claimed is:

1. The combination comprising:
    a bearing (1) having an inner ring and an outer ring housed in a belt pulley;
    a sealing disk (4) covering the bearing clamped between the head of a screw (3) and the inner ring of the bearing, means attaching said sealing disk directly to the inner ring axially and radially and projections (12,15) on the shaft of the screw underlying an edge of the disk (4) to secure the screw (3) to the disk (4) whereby the bearing (1), disk (4) and screw (3) form a unitary assembly for transport;
    the sealing disk (4) has a sleeve-like stamped section (6), which is pressed into the bore of the inner ring, and locking sections (13, 14), formed on the disk, which extend essentially in the radial direction, the edge areas of these locking sections cooperating with the radial projections (12) on the shaft (11) of the screw (3) to form a positive interlock, which prevents the screw (3) from falling out in the axial direction.

2. The combination comprising:
    a bearing (1) having an inner ring and an outer ring housed in a belt pulley;
    a sealing disk (4) covering the bearing clamped between the head of a screw (3) and the inner ring of the bearing, means attaching said sealing disk directly to the inner ring axially and radially and projections (12,15) on the shaft of the screw underlying an edge of the disk (4) to secure the screw (3) to the disk (4) whereby the bearing (1), disk (4) and screw (3) form a unitary assembly for transport;
    the sealing disk has a locking section designed as elastic tongues (14), which are distributed around the periphery and which engage behind projections (15) on the shaft (11) of the screw (3).

* * * * *